March 7, 1967   C. W. BOPP   3,307,713
TELESCOPING BOOM FOR MATERIAL HANDLING MECHANISM
Filed Feb. 13, 1964   6 Sheets-Sheet 1

INVENTOR.
CECIL W. BOPP
BY
Christy, Parmelee & Strickland
Attorneys

INVENTOR.
CECIL W. BOPP

United States Patent Office 3,307,713
Patented Mar. 7, 1967

3,307,713
TELESCOPING BOOM FOR MATERIAL
HANDLING MECHANISM
Cecil W. Bopp, Waterloo, Iowa, assignor to The Greater Iowa Corporation, Des Moines, Iowa, a corporation of Iowa
Filed Feb. 13, 1964, Ser. No. 344,762
4 Claims. (Cl. 212—55)

The present invention relates generally to material handling mechanisms and more specifically to such mechanisms employing a telescoping boom.

The concept of providing a mobile unit having a mast mounting a rotatable boom thereon for handling various materials is disclosed in my prior Patent 2,998,149 granted August 29, 1961. The structure shown thereon provides a mast mounted boom of fixed length rotatable in a horizontal plane, having suspended therefrom a device, referred to as a fork, receiving a load to be raised and lowered relative to the boom and which is selectively movable longitudinally of the boom.

That material handling mechanism found great favor with the trade due to its ability to selectively support a load at a plurality of different vertical positions relative to the boom and also at different positions along the length of the boom. When the boom mounting upon the mast was changed to permit vertical reciprocal pivotal movement thereof relative to the mast, in addition to horizontal rotary movement concurrent therewith, the utility of the mechanism was greatly enhanced. Such construction is shown in my prior Patent 3,082,889 granted March 26, 1963.

To overcome the limitations of a fixed length of boom, I have now incorporated in the material handling mechanism a telescoping boom which may be selectively elongated and retracted while retaining all the previous advantages of the mechanism of Patents 2,998,149 and 3,082,889. In other words, the telescoping boom may be mounted for rotation only in a horizontal plane or may be mounted for both horizontal rotary movement and vertical reciprocal pivotal movement relative to its supporting mast.

The introduction of a telescoping boom upon a material handling mechanism of the character as shown in my foregoing patent has introduced a number of new problems of design in addition to providing a number of new advantages over the boom of fixed length. The telescoping boom construction hereinafter described has been constructed to handle loads varying between 1500 to 7,000 pounds or more and extensible to lengths from 18 feet to 47 feet and more.

One object of the present invention is to provide an extensible and retractable boom comprised of a base section having one or more telescoping sections retractable within the base section and extensible beyond one end of the base section.

Another object of the invention is to provide an extensible and retractable boom comprised to a base section, a tip section and a suitable intermediate section or sections, the movements of which intermediate and tip sections are controlled from the base section.

Another object of the invention is to provide an extensible and retractable boom of the character described wherein the outer or forward tip section from which a load is suspended may be retractable wholly within the outer or forward end of the boom base section.

Another object of the invention is to provide a boom of the character described wherein a plurality of movable sections are successively telescopingly suspended from the base section in collapsed position and progressively advanced and retracted relative to the base section and to each other by means controlled from the base section.

Another object of the invention is to provide a telescoping boom comprised of at least a fixed and a movable section wherein a load suspended from said boom may be selectively disposed wholly beyond the end of the fixed section and intermediate the end of the fixed section and its supporting mast.

A further object of the invention is to provide a boom of two or more telescoping sections having means for suspending a load therefrom whereby the load may be maintained or advanced to any desired position relative to the boom.

These and other objects will be made apparent from the following description and the drawing forming a part thereof, wherein.

Figure 1:
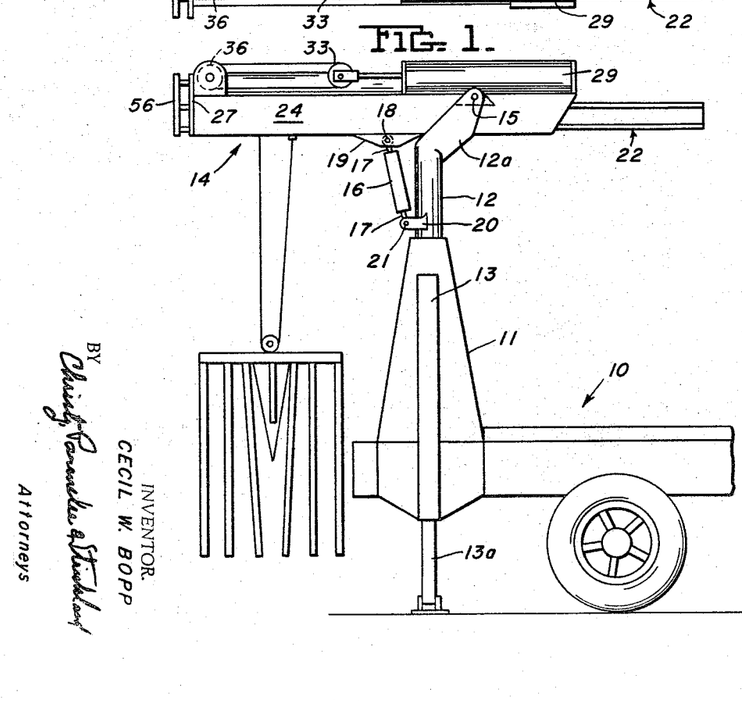
FIG. 1 shows a side elevation of one form of the telescoping boom unloader, having the boom fully collapsed and mounted upon a mast positioned adjacent the rear end of a suitable support, such as a motor truck.
Figures 2, 3:
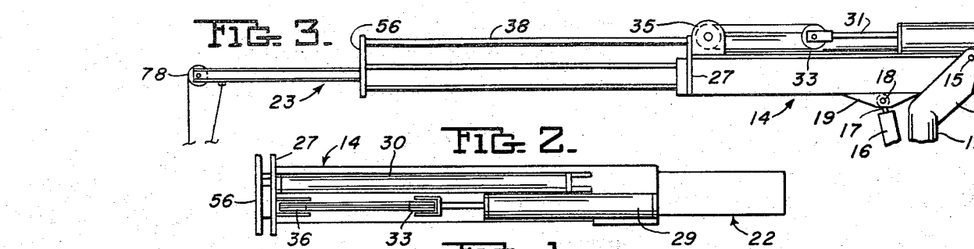
FIG. 2 shows a plan view of the boom of FIG. 1.
FIG. 3 shows a side elevation of the boom of FIG. 1 in fully extended position.

Referring now in detail to the drawing particularly FIGS. 1 to 3 inclusive, reference character 10 indicates a portion of a motor truck, to the rear of which is suitably attached a suitable pedestal 11 receiving a rotatably mounted mast 12. Attached to the pedestal 11 and inclining downwardly and outwardly therefrom at opposite sides thereof, are suitable outriggers comprising housings 13 and retractable ground engaging members 13a mounted therein. Such stabilizers may be of any suitable design and serve to prevent tilting of the supporting truck during horizontal rotation of the loaded boom.

Mounted upon the upper end of mast 12 for rotary movement concurrent therewith is the fixed outer boom section 14. The boom section 14 may be mounted in fixed relation to the top portion of the mast, or as shown in FIGS. 1 and 3 the mast may have a suitable extension 12a, at each side thereof, connected with boom section 14 by means of a pin 15. Providing horizontal support for boom section 14 and also vertical reciprocal pivotal movement to boom section 14 are suitable double acting fluid pressure actuated cylinders 16 suitable pistons and piston rods 17 therein connected by brackets 20 and pins 21 to the mast and by brackets 19 and pins 18 to the boom section 14.

Referring now to FIGS. 1 to 4, inclusive, the boom section 14 is shown as having telescopingly mounted therein an intermediate boom section 22 and an inner boom section 23. In other words, a three section telescoping boom as disclosed in FIGS. 1 and 3 is a basic design, however, additional pairs of boom sections may be added to the basic boom design to provide five or more section telescoping booms, as will be hereinafter discussed. It will be understood that regardless of the number of sections comprising the boom there will be an outer section suitably mounted upon the mast for rotary movement concurrent therewith and the additional sections will be telescoped within the outer section for reciprocal movement relative thereto. It will be understood by those skilled in the art that such boom sections must be constructed to provide sufficient strength as may be required by the load to be handled and the amount of boom extension being provided. It will be noted in FIGS. 1 and 2 that the boom sections 22 and 23, moving within boom section 14, extend through the rear end of boom section 14 when in fully retracted position. Obviously, section 14 may be of a length sufficient to fully enclose sections 22 and 23 when in fully retracted position if required.

Referring now to the fixed boom section, indicated generally as 14, as best shown in FIGS. 5 to 8 inclusive, this section is comprised of two laterally spaced channels 24 having opposing channels connected by top and bottom cover plates 25 and 26. It will be noted that bottom cover plate 26 terminates short of the forward end of section 14 and an end plate 27 encloses the channels 24 adjacent the outer end of section 14 to prevent spreading of said channels. The purpose of so terminating bottom cover plate 26 is to permit the load suspended from the innermost boom section 23 to be disposed between the end of section 14 and the supporting mast 12 as hereinafter discussed. Attached to the outer face of the vertical flanges of channels 24 are bearing plates 28 having a suitable aperture therein to receive the pin 15 upon which the section 14 pivots during lifting and lowering of the boom by extension and retraction of the piston stems 17 in boom lift cylinders 16. It will be understood that one or two cylinders 16 may be employed as necessitated by load requirements.

Figure 8:
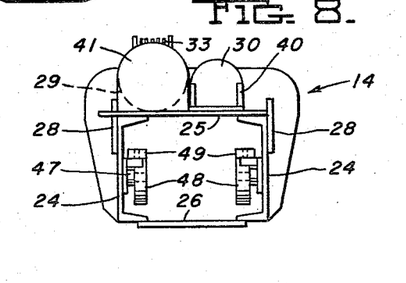
FIG. 8 shows a detail rear end elevation of FIG. 5.

Disposed upon top cover plate 25 and extending in a direction longitudinally of section 14 are two fluid pressure cylinders 29 and 30. Cylinder 29 has mounted therein a double acting piston having a piston rod 31 connected thereto and extending through the forward end of cylinder 29. A suitable sheave yoke 32 is mounted on rod 31 and a plurality of sheaves 33 are received therein upon a bearing pin 34 for free rotation thereon. Longitudinally aligned with cylinder 29 and yoke 32, adjacent the forward end of section 14, is a sheave housing 35 mounted upon top cover plate 25 and attached to plate 27. Disposed within housing 35 are a plurality of sheaves 36 rotatably mounted upon pin 37 traversing the housing. Sheaves 36 preferably correspond in number to sheaves 33. Adjacent cylinder 29 is cylinder 30 having a double acting piston therein to which is attached a piston rod 38 which extends through the end of cylinder 30 and adjacent opening 39 in plate 27 for attachment to boom section 22, as hereinafter discussed. Adjacent the rear of section 14, cylinder 30 abuts and is secured to a suitable bracket 40 and cylinder 29 abuts and is secured to a suitable plate 41. Disposed within section 14 and secured in longitudinal spaced relation upon the inner face of each channel 24 are spaced pairs of opposing brackets 42. Pivotally mounted upon said brackets, by means of pins 43 are pairs of spaced plates 44. Adjacent the outer ends thereof, plates 44 are connected by pins 45 upon which are rotatably mounted the rollers 46. Adjacent the inner end of section 14 and secured to the inner faces of the vertical web of channels 24, as best shown in FIG. 8, are brackets 47 upon which are mounted rollers 48 disposed in alignment with rollers 46. Mounted on brackets 47 and overlying rollers 48 are the rollers 49 received upon the pins 50.

Figure 4:
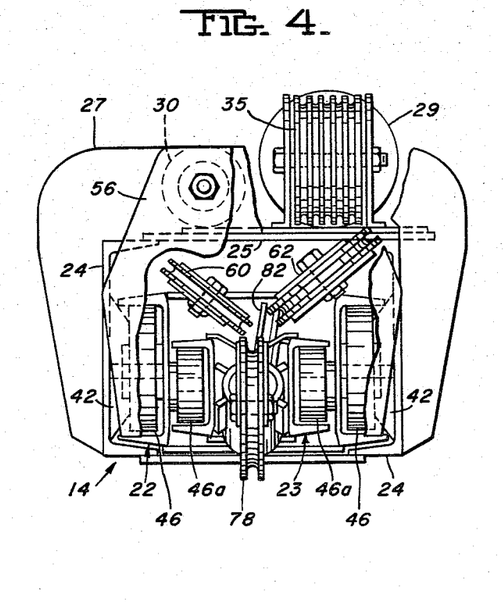
FIG. 4 shows an end elevation of the boom of FIG. 1.

Referring now to FIGS. 9 to 12 the intermediate boom section 22 is comprised of laterally spaced channels having vertical webs 51 provided with out-turned flanges 52. Such flanges 52 are bent inwardly so as to dispose the normally sloping inner flange face 53 in a plane substantially normal to the web 51. The upper web faces 53 of channels 51 are received upon the rollers 46 and 48 of outer fixed boom section 14 as shown in FIG. 4. Channel webs 51 are connected by top and bottom cover plates 54 and 55, respectively. Bottom plate 55 terminates short of the front end of the boom section for a purpose to be discussed. Disposed transversely of the outer end of boom section 22 is a plate 56 secured to the ends of the channel webs 51 and flanges 52, by any suitable means, such as welding. A suitable brace 57 is secured to plate 56 and adjacent channel to resist deflection in plate 56 from the piston stem 38 in moving boom section 22 relative to boom section 14. A suitable opening 58 in plate 56 serves to receive and attach piston stem 38 thereto.

Mounted upon cover plate 54 adjacent each end of boom section 22 is a suitable bracket 59 receiving a sheave 60. Cover plate 54 is suitably notched to receive the bracket and sheave depending therethrough. Adjacent the front end of boom section 22, at the opposite side from sheave 60, is mounted a bracket 61 and sheave 62. Spaced longitudinally of boom 22 and mounted upon the inner faces of channel webs 51 are suitable brackets 42a and rollers 46a, similar to but preferably smaller than the corresponding brackets 42 and rollers 46 of boom section 14. Additionally, adjacent the rear of boom section 22, upon opposite inner faces of webs 51 are mounted brackets 47a and rollers 48a, 49a similar to but preferably smaller than the brackets 47 and rollers 48, 49 of boom section 14.

Figure 13:
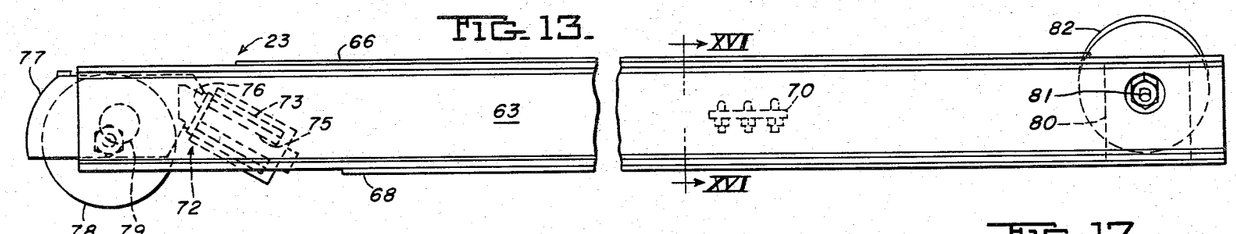
FIG. 13 shows a detail side elevation of the innermost or tip telescoping boom section.
Figure 14:
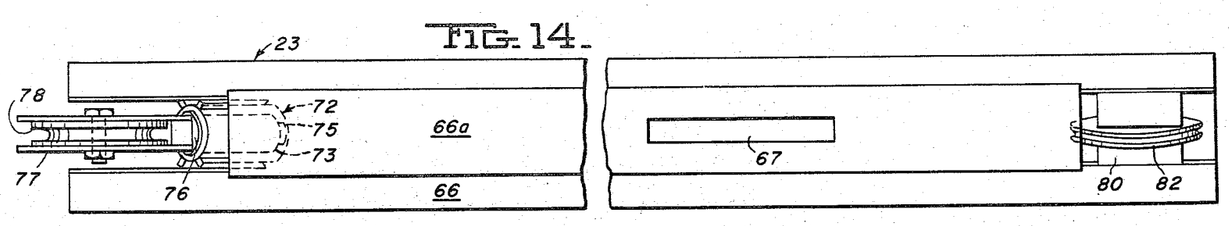
FIG. 14 shows a detail plan view of FIG. 13.
Figure 15:
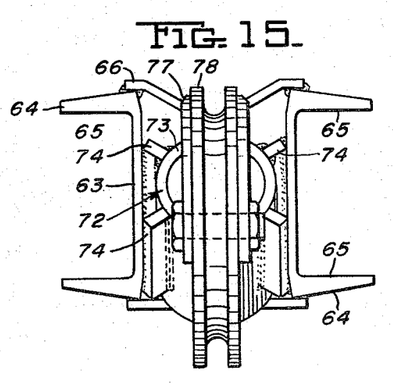
FIG. 15 shows a detail front elevation of FIG. 13.
Figure 16:
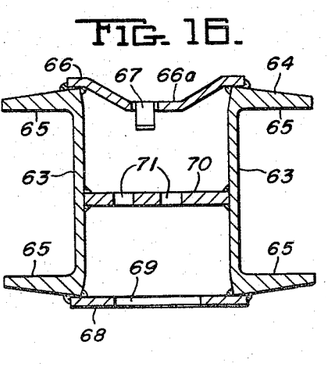
FIG. 16 shows a section taken on lines 16—16 of FIG. 13.
Figure 17:
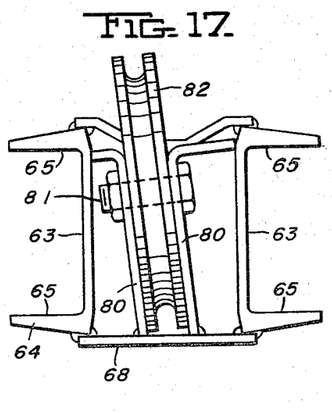
FIG. 17 shows a rear elevation of FIG. 13.

Referring now to FIGS. 13 and 17 showing the innermost boom section 23, which is the shorter of the three boom sections. Section 23 is comprised of two transversely spaced channels having vertical webs 63 and outstanding top and bottom flanges 64. The flanges 64, as in boom section 23, are offset inwardly to provide a surface 65 which is disposed substantially normal to adjacent web 63 for reception upon the rollers 46a, 48a of boom section 22. Channel top flanges 64 are joined by a top cover plate 66 having a recessed longitudinally extending midportion 66a having an opening 67 therein for a purpose to be hereinafter discussed. Channel bottom flanges 65 are connected by a bottom cover plate 68 having an opening 69 therein aligned with top cover plate opening 67. Intermediate openings 67 and 69 is a transverse member 70 welded to both webs 63 and provided with two rows of openings 71 for a purpose hereinafter set forth. Cover plate 66 terminates short of each end of the boom section 23 and the bottom cover plate 68 terminates short of the forward end of section 23 for purposes hereinafter set forth.

Mounted adjacent the forward end of boom section 23 and disposed between channel webs 63 is a socket member 72 comprised of a hollow cylindrical member 73 angularly disposed between channel webs 63 and provided with a plurality of longitudinally extending rib members 74 disposed adjacent said channel webs 63 and suitably secured thereto, as by welding. A shank member 75 is received within member 73 and provided with a suitable means, such as collar 76, for bearing support upon the upper face of member 73. Upon the upper end of shank member 75 are mounted a pair of spaced members 77 between which is disposed a pulley sheave 78 rotatably mounted upon a pin 79 disposed transversely of the sheave 78 and members 77. Adjacent the rear end of boom section 23 and disposed between flanges 63 are a pair of spaced oppositely disposed bracket members 80 having their upper ends welded to webs 63 and their lower ends welded to bottom cover plate 68. Disposed between bracket members 80 upon a suitable transverse pin member 81 is a sheave 82.

Figures 18, 19:
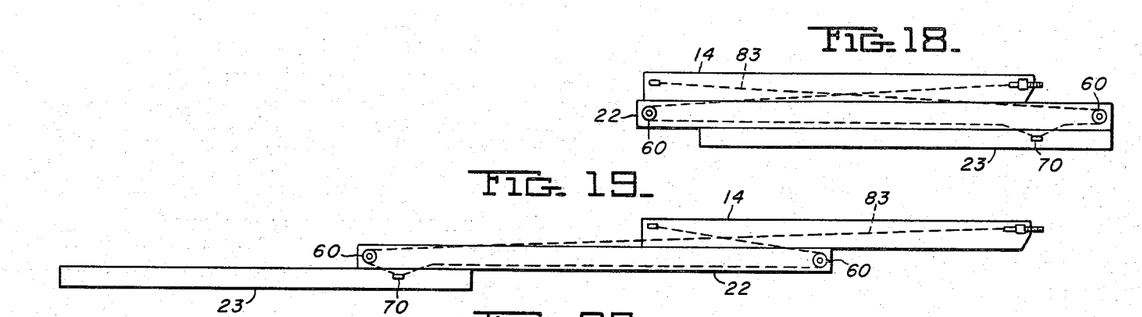
FIG. 18 shows schematically the arrangement of the telescoping boom sections of FIG. 1 and the boom extension cables.
FIG. 19 shows schematically the telescoping boom sections of FIG. 18 in extending position and the boom extension cables.

Referring now to FIGS. 18 and 19 wherein are shown schematic arrangements the three telescoping boom sections of FIG. 3 and the cable 83 for selectively extending and retracting the telescoped boom sections 22 and 23. As best shown in FIG. 4, boom outer section 14 is constructed of a width and depth to receive both boom sections 22 and 23. Boom section 22 is supported upon section 14 and boom section 23 is supported upon boom section 22.

In FIG. 18 the three boom sections 14, 22 and 23 are arranged in fully retracted position but vertically spaced instead of telescoped within section 14. It will be noted that in fully retracted position sections 22 and 23 project rearwardly of section 14. Obviously, to extend section 14 rearwardly into substantially vertical alignment with sections 22 and 23 would in no way affect the extension and retraction movements of sections 22 and 23 relative to 14. Since section 14 is an integral part of the boom functioning as a load carrying member over which the suspended load travels in advancing from a fully retracted to fully extended position, the length of section 14 need only be such as to afford support for the telescoped sections and support during extension of the telescoped sections.

FIG. 18 shows the arrangement of the section extension and retraction cable 83 when the boom is in fully collapsed position. It is of significance that the outer or advancing end of inner section 23, from which the load is to be suspended, is disposed inwardly of the forward end of the fixed outer section. Hence with the boom in fully collapsed position the load may be suspended any desired distance inwardly of the end of the boom fixed section 14 and intermediate section 22. In this manner a load can be deposited upon the truck bed adjacent the mast pedestal.

Referring again to FIG. 18, the cable 83 reeved over sheaves 60 of member 22 has its ends fixed in longitudinal spaced relation to section 14. Hence the length of cable 83 remains fixed during all relative movements between sections 14 and 22, but the length of the cable ends, from their associated sheaves 60 to the points of attachment to section 14, vary in proportion to the advancement and retraction of section 22 relative to section 14 by the piston rod 38 as shown in FIGS. 1 and 3. Since section 23 is merely attached to the lower run of cable 83, between sheaves 60, section 23 moves concurrent with the said lower run. This latter movement is illustrated by FIG. 19 illustrating schematically the cable 83 and sections 22 and 23 in extended position.

Figure 6:
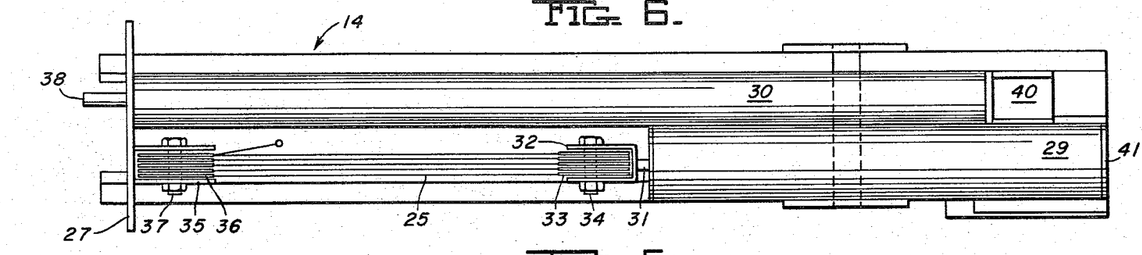
FIG. 6 shows a detail plan view of FIG. 5.
Figure 7:
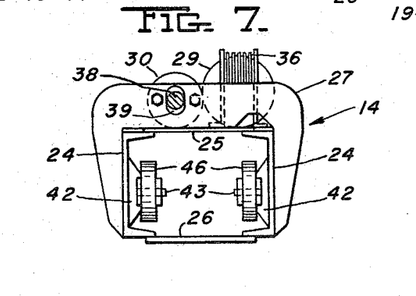
FIG. 7 shows a detail front end elevation of FIG. 5.
Figures 20, 21:
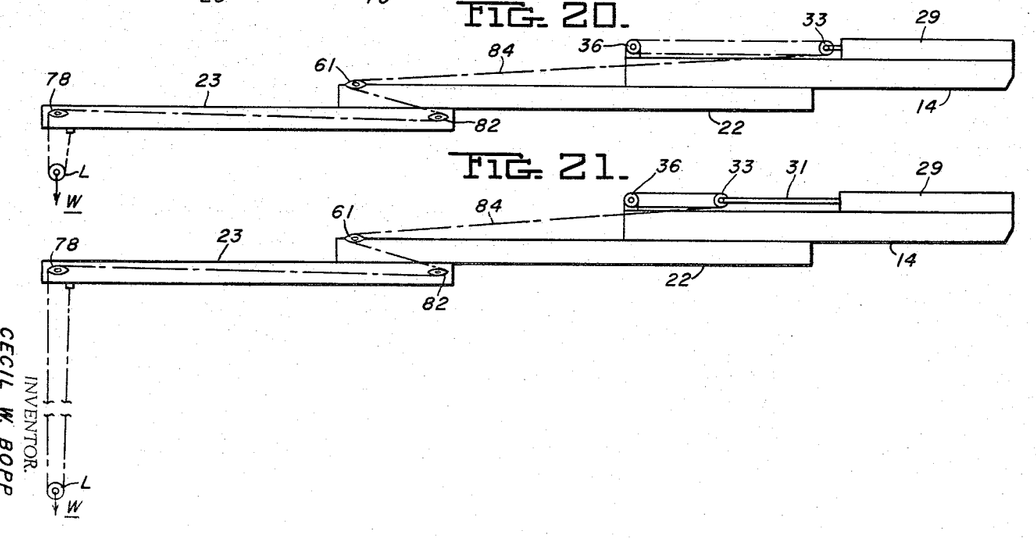
FIG. 20 shows schematically the arrangement of the telescoping boom sections of FIG. 1 and the load lifting cables.
FIG. 21 shows schematically the arrangement of the extended boom sections of FIG. 20 and the load lifting cables.

Referring now to FIGS. 20 and 21 of the drawing which schematically illustrate the lacing of the lift cable 84 over the several boom sections, it will be noticed that one end of the lift cable 84 is fixed to the outer boom section 14, as shown in FIG. 6, and after a plurality of runs over the sheaves 33 and 36 the free end of the cable 84 is reeved over idler sheave 61 on boom section 22 and sheaves 82 and 78 on boom section 23. Thus assuming a load W depending from the cable and depending over idler sheave 78 the total length of the cable 84 extending from pulleys 33 and over outer idler pulley 78 will be unchanged as the boom sections 22 and 23 move from fully retracted position to fully extended position. Thus, any load W suspended from pulley L will remain a fixed distance from sheave 78 during extension and retraction of the boom sections 22, 23. Thus, if the boom is maintained in a horizontal plane, the load will move in a horizontal plane, provided the sheaves 33 remain in a fixed relation to fluid pressure actuated cylinder 29. However, should it be desired to lower the load W, the sheaves 33 would be advanced towards sheaves 36 increasing the available length of cable 84 between sheaves 33 and 78, permitting the load to lower an amount equal to the increase in the available length of the cable 84. Correspondingly, should the load W be depending any distance up to the maximum length of cable 84 and it is desired to raise the load towards the boom, the sheaves 33 would be retracted by cylinder 29 and piston rod 31 to shorten the available cable length to raise the load W a desired amount.

It will be apparent that when the boom is mounted upon the mast for vertical pivotal movement relative thereto, a longer cable may be necessary than for a horizontally fixed boom. In such cases the number of sheaves in housings 35 and 32 may be increased to accommodate the increased length of cable while using the same cylinder 29 and same stroke of the piston rod stem 31.

From the foregoing, it will be apparent to those skilled in the art that the effective length of the boom may be increased by either increasing the length of each boom section or increasing the number of boom sections. Since it is the practice in the art to provide material handling mechanisms of this class in a plurality of capacities while retaining the same boom length, the recommended practice is to increase the number of boom sections to obtain increased extended boom lengths.

When increasing the boom length by means of an increased number of boom sections, it is desirable to maintain an odd number of boom sections. The basic three-section boom of the invention has been shown herein as comprising a fixed section and two telescoping sections. The next increase in the number of boom sections would be to five and then to seven, etc. Obviously, the length of each section may also be varied along with an increase of the number of sections. In this manner a very compact, but desired length of boom may be obtained. It will be recognized that the overall length of the fully retracted boom can become a very serious clearance problem when the mechanism is loading or unloading in a restricted area.

Figures 22, 23, 24:
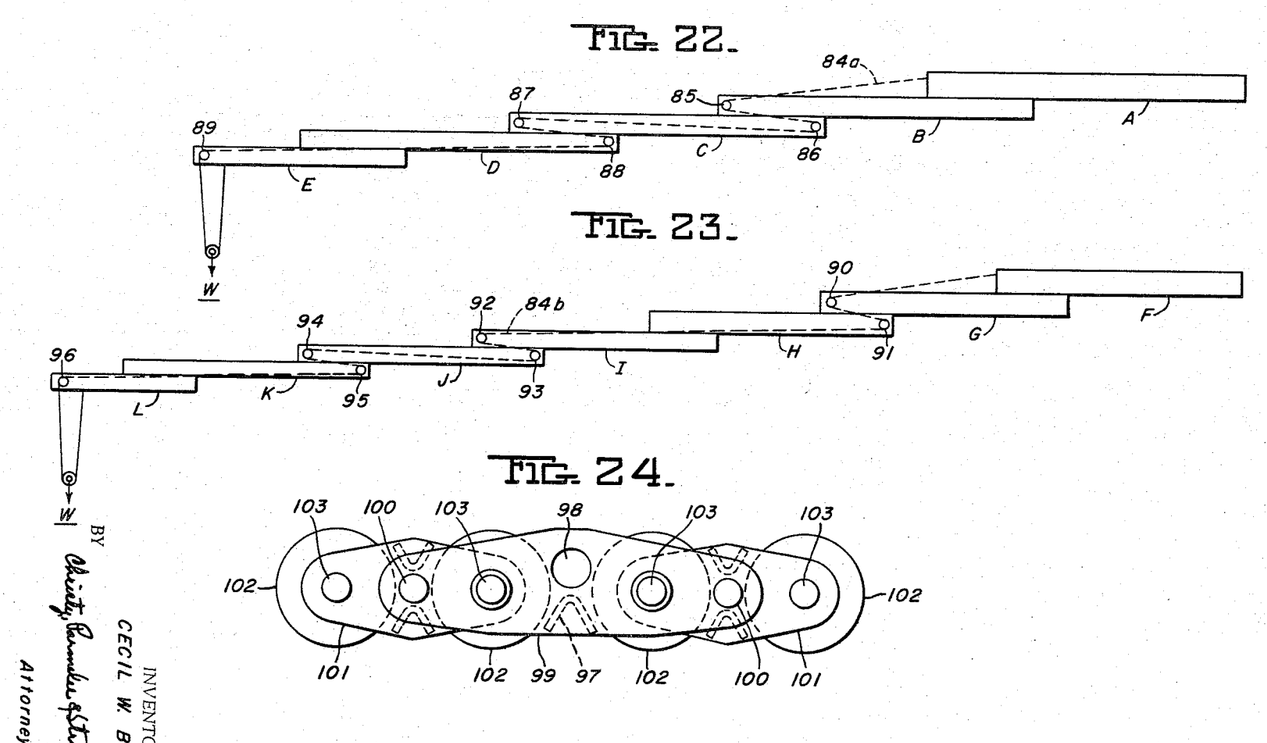
FIG. 22 shows a modified telescoping boom of five sections in extended position and the arrangement of the boom lift cables.
FIG. 23 shows a modified telescoping boom of seven sections in extended position and the arrangement of load lifting cables.
FIG. 24 shows a modified form of the boom section supporting rollers.

Referring now to FIG. 22 of the drawing, wherein a five section boom is illustrated in extended position and the lifting cable 84a and cooperating sheaves are illustrated schematically, it will be understood that in fully retracted position the four telescoping sections will be disposed within the fixed outer section and the tip or innermost section will bear substantially the same relation, in length, to the next adjacent outer section as illustrated in FIG. 1.

For convenience, the boom sections, in FIG. 22, will be indicated as A, B, C, D and E, with section A corresponding to section 14 of FIG. 1, section B corresponding to section 22 of FIG. 1, and section C corresponding to section 23 of FIG. 1. The load lifting cable will be identified as 84a corresponding to cable 84 of FIG. 1, but of longer length to accommodate the increased number of sections. Cable 84a will be reeved over the same arrangement of sheaves, upon the upper face of the fixed section A, as in FIGS. 1 and 3.

As shown in FIG. 22, cable 84a feeding from sheaves 33 on section A is reeved over idler pulley 85 adjacent the outer end of section B, over the rear idler 86 of section C and to the front idler 87 of the same section. Thereafter, cable 84a is reeved over an idler 88 at the rear of section D and forwardly over the idler 89 of tip section E from which it depends to receive a load W.

Since section B will be extended and retracted relative to section A by a piston stem 38 as in FIG. 3 and the cable and pulley arrangement for extending and retracting the telescoping sections C, D and E will be similar to that of the basic boom of FIG. 1, as illustrated in FIG. 19, the load W suspended from the tip end of boom section E will maintain a constant vertical relation to the entire boom for the same reasons as stated with regard to the basic boom of FIGS. 18, 19 and under the same conditions.

As regard the boom section extension cables (not shown) to be employed with the five section boom of FIG. 22, it will be apparent from an inspection of FIG. 19 that tip section E of FIG. 22 is the equivalent of section 23 of FIG. 19. Also sections B, C and D of FIG. 22 are each the equivalent of section 22 of FIG. 19. Therefore, to couple sections D, C and B of FIG. 22 together by a similar combination of cable and sheaves employed to connect section 22 to sections 14 and 23 in FIG. 19, with the bottom run of the cable of sections B, C, and D of FIG. 22 connected to the adjacent telescopingly received section as in FIG. 19, the same relative movements between the sections of FIG. 19 will be obtained in FIG. 22.

Referring now to the schematic seven-section boom of FIG. 23, illustrating the reeving of the load cable 84b over sheaves 90 to 96 inclusive, of boom sections G to L inclusive, and comparing this arrangement with the corresponding cable and sheaves of FIGS. 20 and 22, it will be apparent that the boom sections, G to L inclusive, may be telescopingly extended and retracted in FIG. 23 without necessarily changing the length of cable 84b, except when it is desired to change the vertical relation between load W and the top section L. Should such be necessary, it may be accomplished by the same means employed in FIGS. 20 and 21 for the same purposes.

As regards the boom extension cables and sheaves (not shown), to be employed with the seven-section boom of FIG. 23, for extending and retracting boom sections relative to each other and to the fixed boom section, these cables and sheaves are merely multiples of those employed in FIG. 19. Comparing the schematic drawings of FIGS. 19 and 23, boom section 14 of FIG. 19 compares with boom section G of FIG. 23, and boom section 22 of FIG. 19 is advanced by piston stem 38 (FIGS. 3 and 6) as is boom section G of FIG. 23. Boom sections G, H, I, J and K of FIG. 23, as in boom section 22 of FIG. 19, are provided with spaced idler sheaves similar to sheaves 60 and over which is trained a cable similar to cable 83. As in FIG. 19, each cable, similar to cable 83, trained over the sheaves of boom sections G, H, I, J and K has its free ends connected to the preceding boom section and its bottom run, beneath the sheaves, attached to the succeeding boom section, as at 70. Thus in FIG. 23, we have five sets of spaced sheaves and cable trained thereover. As previously stated, boom section 22 of FIG. 19 and boom section G of FIG. 23 are advanced and retracted by the aforesaid piston stem 38 and each succeeding boom section in FIGS. 19 and 23, is advanced and retracted by its connection at 70 to the bottom run of the cable on the adjacent overlying boom sections.

Figure 5:
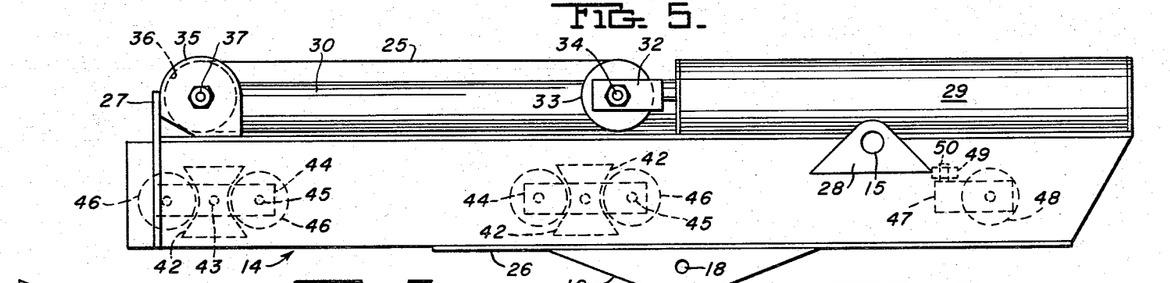
FIG. 5 shows a detail side elevation of the fixed outer boom section, apart from the loads of FIG. 1.
Figure 9:
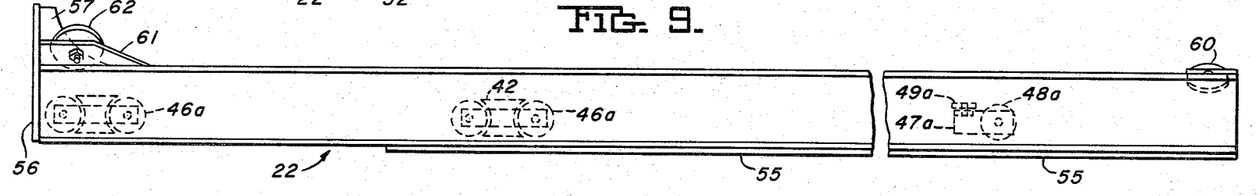
FIG. 9 shows a detail side elevation of an intermediate telescoping boom section.
Figure 10:
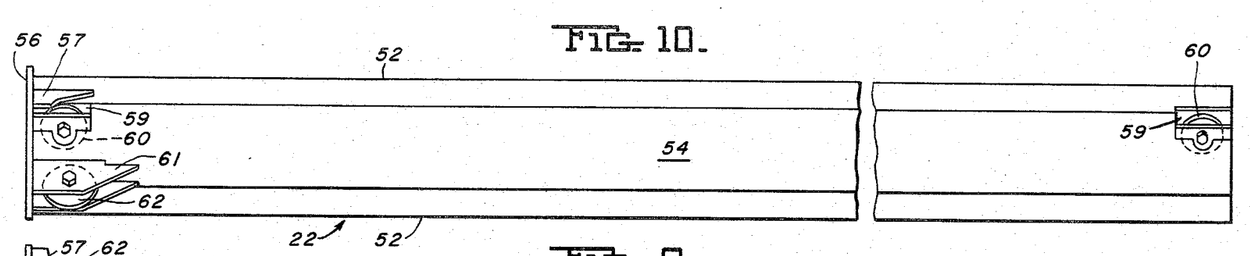
FIG. 10 shows a detail plan view of FIG. 9.
Figure 11:
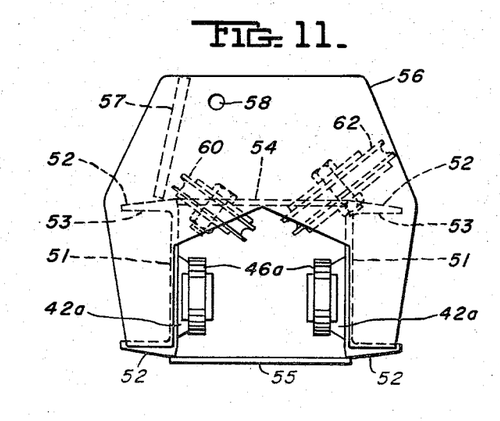
FIG. 11 shows a front end view of FIG. 9.
Figure 12:
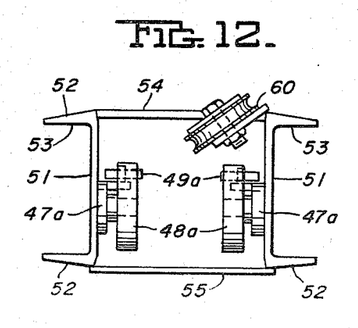
FIG. 12 shows a rear end elevation of FIG. 9.

Referring now to FIG. 24 of the drawing, there is shown a modified form of the boom section supporting rollers as disclosed in FIGS. 4, 5 and 9 of the drawing. FIG. 24 shows in a side elevational view a central spacing bracket 97 attachable to the adjacent faces of the lever plates 99 by any suitable means. Said assembly being adapted for mounting upon an adjacent face of the boom section by means of pivot pin 98. Pivotally mounted upon lever plates 99 adjacent each end thereof by means of pivot pins 100 are pairs of spaced arms 101 maintained in spaced relation by brackets 97a. Disposed between arms 101 adjacent opposite ends thereof are rollers 102 rotatable upon pivot pins 103 connecting arms 101 in spaced relation. The arrangement above described provides for the axis of rotation of rollers 102 to be selectively positioned in a single horizontal plane as the rollers move upon a horizontal surface or to accommodate either pair of rollers 102 for engagement with a surface not in a horizontal plane, with that of the other pairs of rollers 102. In other words, each pair of arms 101 pivotally connected to levers 99 may rotate upon its pivot 100 relative to the other pair of arms 101. The arrangement shown in FIG. 24 is superior to that of FIGS. 4, 5 and 9, in suspending heavier loads and in accommodating to uneven or distorted bearing surfaces.

As indicated in the drawing, the boom of the invention is actuated by suitable devices for actuating the boom sections, rotation of the mast and pivoting of the boom relative to the mast. Customarily, as in my hereinmentioned prior Patents 2,998,149 and 3,082,889, electrically actuated controls for actuation of the mast and boom are associated with the mast pedestal and a flexible cable of substantial length, as much as 25 feet long, is connected with said electrical controls with a hand-held remote control box at the outer end of the cable. Such electrically actuated controls are conventional, forming no part of the present invention, and have not been illustrated herein.

For purposes of illustration and not limitation, specific details of construction and arrangement have been shown and described herein. I do not intend to be bound thereby except as made necessary by the scope of the appended claims.

I claim:
1. In a material handling device, in combination,
a vertically disposed mast;
a boom mounted on said mast and comprised of a hollow outer section connected to the mast and a plurality of telescoping inner sections disposed within the said outer section for reciprocal advancement through the forward end of the outer section and retraction within said outer section;
means on each said sections providing support for the section telescopingly received therein;
means mounted on said outer boom section and connected with said telescoping sections for selectively advancing said telescoping sections relative to one end of said outer section;
a sheave block containing a plurality of sheaves mounted upon the outer section adjacent the forward end thereof;
a second sheave block containing a plurality of sheaves disposed in rearward spaced relation to said first named sheave block and connected to a power means for advancing and retracting said second named sheave block relative to the first named sheave block;
a sheave mounted adjacent alternate forward and rear ends of successive telescoping boom sections within said outer section, with one such telescoping section having a sheave mounted adjacent each end thereof;
a cable reeved over the sheaves of the telescoping members to the sheave block attached to said power means, thence to said sheave block mounted upon said outer section with one end of the cable from said sheave blocks being anchored to said outer section and the opposite end of the cable depending over a sheave on the outer end of the innermost telescoping section and terminating in a load lifting hook.

2. The material handling device as defined in claim 1, wherein the end of the cable depending over the sheave at the outer end of the innermost telescoping section is looped beneath said section to receive a sheave of a load lifting device and the free end of the cable is attached to the adjacent face of the said section.

3. The material handling device as defined in claim 1 wherein the innermost telescoping boom section when in fully retracted position has its forward end disposed inwardly of the forward end of the said fixed outer boom section, whereby a load suspended from the forward end of said inner section is disposed intermediate the forward end of the outer boom section and the mast providing support for the boom outer section.

4. The material handling device as defined in claim 1, wherein said means for advancing and retracting said telescoping sections, comprises,
 (a) a power actuated reciprocating member mounted on said fixed outer boom section and connected to the forward end of the larger telescoping boom section for selectively advancing and retracting the latter within the fixed outer boom section,
 (b) additionally the telescoping sections are connected in groups of two, the outermost section of the group being provided with a sheave rotatably mounted adjacent each end thereof, a cable reeved about said sheaves with the free ends of the cable being crossed above the sheaves and the said free ends of the cable being attached in longitudinal spaced relation upon the adjacent outer section, and the next inner section of the pair is attached to the adjacent bottom run of said cable so as to move concurrent therewith, and
 (c) as successive pairs of telescoping sections are added to the boom the overlying telescoping section of the pair is provided with sheaves mounted adjacent each end thereof with a cable reeved over said sheaves having the cable ends crossed above said sheaves and attached in spaced relation upon the adjacent overlying section and thereafter the second section of the pair is attached intermediate its ends to the bottom run of the cable reeved over the spaced sheaves of the adjacent overlying telescoping section.

References Cited by the Examiner

UNITED STATES PATENTS

| | | | |
|---|---|---|---|
| 2,668,625 | 2/1954 | Garland | 212—55 |
| 2,917,189 | 12/1959 | Isaacs. | |
| 2,919,036 | 12/1959 | Raymond | 212—55 X |
| 3,093,248 | 6/1963 | Winter | 212—55 |
| 3,112,035 | 11/1963 | Knight | 212—55 |
| 3,129,821 | 4/1964 | Graham et al. | 212—55 |
| 3,154,025 | 10/1964 | Worthington | 212—55 |

FOREIGN PATENTS 101,213   11/1962   Norway.

ANDRES H. NIELSEN, *Primary Examiner.*

SAMUEL F. COLEMAN, HUGO O. SCHULZ,
*Examiners.*

EVON C. BLUNK, A. L. LEVINE, *Assistant Examiners.*